(12) United States Patent
Dorfman et al.

(10) Patent No.: US 9,103,013 B2
(45) Date of Patent: Aug. 11, 2015

(54) ABRADABLE COMPOSITION AND METHOD OF MANUFACTURE

(75) Inventors: Mitchell R. Dorfman, Smithtown, NY (US); Chris Dambra, Flushing, NY (US); Walter Pietrowicz, Bethpage, NY (US); Scott Wilson, Zurich (CH); Daniel Garcia, Alberta (CA); Petr Fiala, Alberta (CA); Eric Kozculab, Alberta (CA); Dieter Rudolf Sporer, Winterthur (CH); Omar B. Al-Sabouni, Medford, NY (US); Montia C. Nestler, Ridgefield, NJ (US); Eric J. Reents, East Northport, NY (US); Gustavo Arevalo, Westbury, NY (US)

(73) Assignee: OERLIKON METCO (US) INC., Westbury, NY (US)

( * ) Notice: Subject to any disclaimer, the term of this patent is extended or adjusted under 35 U.S.C. 154(b) by 371 days.

(21) Appl. No.: 13/575,237

(22) PCT Filed: Jan. 25, 2011

(86) PCT No.: PCT/US2011/022445
§ 371 (c)(1),
(2), (4) Date: Jul. 25, 2012

(87) PCT Pub. No.: WO2011/094222
PCT Pub. Date: Aug. 4, 2011

(65) Prior Publication Data
US 2012/0295825 A1  Nov. 22, 2012

Related U.S. Application Data
(60) Provisional application No. 61/298,391, filed on Jan. 26, 2010, provisional application No. 61/382,729, filed on Sep. 14, 2010.

(51) Int. Cl.
B22F 1/00 (2006.01)
B22F 7/00 (2006.01)
(Continued)

(52) U.S. Cl.
CPC ... *C23C 4/04* (2013.01); *C08K 3/10* (2013.01); *C08K 3/38* (2013.01)

(58) Field of Classification Search
USPC ............... 75/252, 254; 106/286.1, 286.2; 508/150, 151, 154
See application file for complete search history.

(56) References Cited

U.S. PATENT DOCUMENTS
3,617,358 A  11/1971  Dittrich
3,655,425 A   4/1972  Longo
(Continued)

FOREIGN PATENT DOCUMENTS
CA  2639732  3/2010

OTHER PUBLICATIONS
Faraoun et al., "Improvement of thermally sprayed abradable coating by microstructure contol", Surface & Coating Technology, 2006, pp. 2303-2312 vol. 201.
(Continued)

*Primary Examiner* — Ellen McAvoy
(74) *Attorney, Agent, or Firm* — Greenblum & Bernstein, P.L.C.

(57) ABSTRACT

A thermal spray powder having a first component A mechanically blended with a second component B, wherein the first component A is a metal or metal composite, preferably at least one of Ni—Cr—Al clad ABN, Ni—Cr—Al clad HBN, Ni—Cr—Al clad agglomerated hexagonal boron nitride powder with organic binder, Ni—Cr—Al agglomerated hexagonal boron nitride powder with inorganic binder, an MCrAlY type powder where M is at least one of Ni, Co, Fe, and wherein component B is a polymer clad with at least one of nickel, nickel alloys, nickel chrome alloys, nickel chrome aluminum alloys, nickel aluminum alloys, cobalt and cobalt alloys. The result is a thermal spray powder of four distinctly different phases making the powder a four-phase blend.

25 Claims, 6 Drawing Sheets

(51) Int. Cl.
*C23C 4/04* (2006.01)
*C08K 3/10* (2006.01)
*C08K 3/38* (2006.01)

(56) References Cited

U.S. PATENT DOCUMENTS

| | | | |
|---|---|---|---|
| 4,291,089 A | 9/1981 | Adamovic | |
| 5,049,450 A | 9/1991 | Dorfman | |
| 5,122,182 A | 6/1992 | Dorfman | |
| 5,196,471 A | 3/1993 | Rangaswamy | |
| 5,434,210 A | 7/1995 | Rangaswamy | |
| 5,506,055 A | 4/1996 | Dorfman | |
| 5,976,695 A | 11/1999 | Hajmrle | |
| 6,808,756 B2 | 10/2004 | Hajmrle | |
| 6,887,530 B2 | 5/2005 | Fiala | |
| 7,008,462 B2 | 3/2006 | Fiala | |
| 7,052,527 B2 | 5/2006 | Hajmrle | |
| 7,135,240 B2 | 11/2006 | Fiala | |
| 7,179,507 B2 | 2/2007 | Fiala | |
| 7,267,889 B2 | 9/2007 | Hajurle | |
| 7,582,365 B2 | 9/2009 | Walters | |
| 7,763,573 B2 | 7/2010 | Hajmrle | |
| 2004/0005452 A1* | 1/2004 | Dorfman et al. | 428/323 |
| 2005/0158572 A1 | 7/2005 | Fiala | |
| 2005/0287390 A1 | 12/2005 | Hajmne | |
| 2006/0193993 A1 | 8/2006 | Dorfman | |
| 2007/0099014 A1 | 5/2007 | McCullough | |
| 2008/0145554 A1* | 6/2008 | Ghasripoor et al. | 427/450 |
| 2008/0187754 A1 | 8/2008 | Longo | |
| 2013/0004786 A1* | 1/2013 | Croopnick et al. | 428/544 |

OTHER PUBLICATIONS

Forms PCT/IB/326, 373 and 237 issued in PCT/US2011/022445.

* cited by examiner

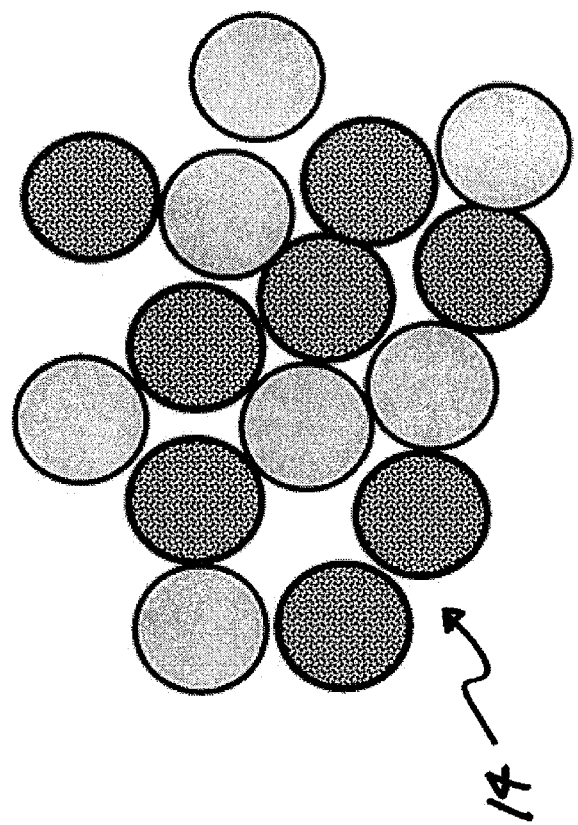
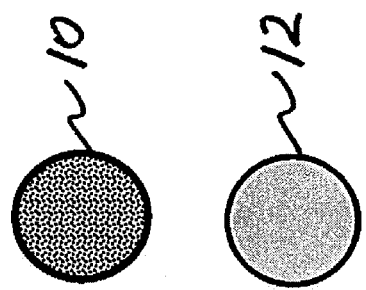
FIG 1

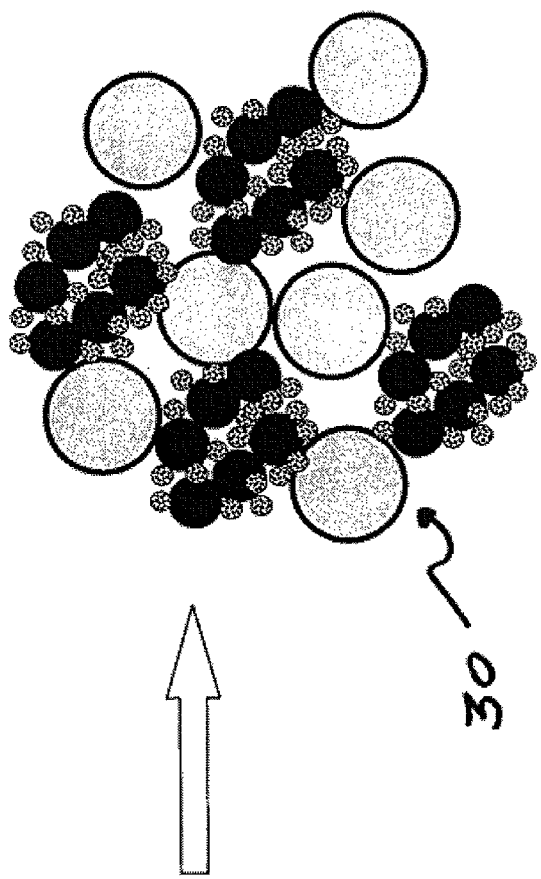
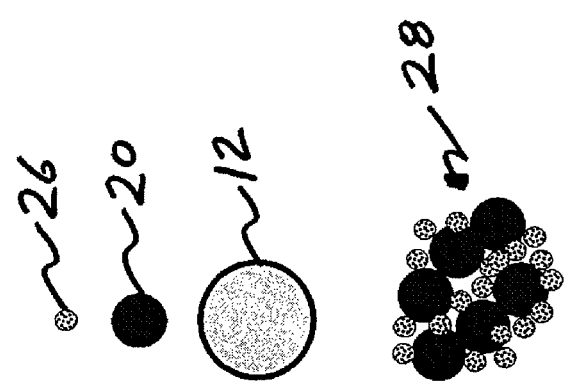
Fig. 5

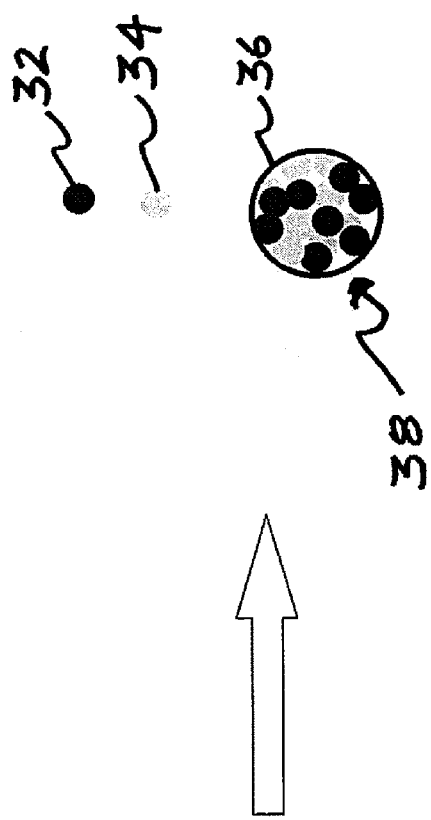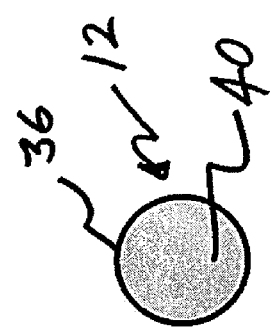
Fig. 6

ABRADABLE COMPOSITION AND METHOD OF MANUFACTURE

CROSS-REFERENCE TO RELATED APPLICATIONS

The instant application is an International Application based on U.S. provisional application No. 61/298,391, filed Jan. 26, 2010, and U.S. provisional application No. 61/382,729, filed Sep. 14, 2010, the disclosures of which are hereby expressly incorporated by reference hereto in their entireties.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

The following patents and patent publications, and patents that issued from these publications, are incorporated in their entireties by reference: CA2639732 (A1), U.S. Pat. No. 7,582,365, U.S. Pat. No. 7,267,889, U.S. Pat. No. 7,763,573, U.S. Pat. No. 6,887,530, U.S. Pat. No. 7,179,507, U.S. Pat. No. 7,008,462, U.S. Pat. No. 7,135,240, U.S. Pat. No. 7,052,527, U.S. Pat. No. 6,808,756, U.S. Pat. No. 5,976,695, U.S. Pat. No. 5,434,210, U.S. Pat. No. 5,196,471, U.S. Pat. No. 5,506,055, U.S. Pat. No. 5,122,182 and U.S. Pat. No. 5,049,450.

OEM manufacturer spray powders that form abradable coatings to improve turbine engine efficiency. These abradable powders are generally sprayed onto a surface using plasma or low velocity combustion processes. It is known that in many plasma applications for clearance control coatings, also known as abradable coatings, these coatings are sprayed using: 1) blends of polymer and metal or ceramic or 2) blends of solid lubricant and metal or ceramic or 3) co-sprayed with polymer or solid lubricant and ceramic or metal.

One form of powder for thermal spraying is composite powder such as disclosed in U.S. Pat. No. 3,617,358 (Dittrich). This patent teaches the use of the spray drying process for making the composites, involving the spraying of a slurry of very fine powdered constituents with a binder to form droplets, and drying the droplets into a powder. There may be only a single constituent, or multiple constituents may be incorporated, for example in a cermet powder of a metal and a non-metal.

Other composite forms are known for thermal spraying, for example metal cladding of a ceramic core as disclosed in U.S. Pat. No. 4,291,089 (Adamovic). According to this patent a clad powder such as nickel alloy clad bentonite is useful for producing thermal sprayed abradable seal coatings for gas turbine engines. Cladding of metal core particles with finer particles of ceramic is taught in U.S. Pat. No. 3,655,425 (Longo and Patel) for similar purpose.

Another example of a powder for thermal spray is disclosed in U.S. Pat. No. 5,122,182 (Dorfman). This patent discloses a two constituent blend, however both constituents are a metal plus a non-metal, and they are approximately the same, with certain predetermined ratios. Thus, it is also known that the prior art teaches a 3 phase (matrix (metal or ceramic))+solid lubricant+polyester abradable material.

Although the prior art coatings meet the design intent of applications, there are reliability and high cost issues with the previous powders and processes used to make the coatings. Accordingly, what is needed is an improved powder for use in forming abradable coatings.

BRIEF SUMMARY OF THE INVENTION

For the purposes of clarity in terminology, a composite means two or more particles in physical contact. These composites usually include a binder, however a binder is not always included. Additionally, cladding may occur mechanically or chemically as known in the art.

An object of the invention is to create a novel form of a composite powder that forms an abradable by thermal spraying a first component A that is mechanically blended with a second component B.

The foregoing and other objects are achieved by a thermal spray powder blend comprising a first component powder and a second component powder. The component powders are in the form of composite particles each of which comprises pluralities of sub-particles of metal and non-metal, the latter typically being a ceramic or a polymer. The composite particles of the second powder have a substantially different morphology than the composite particles of the first powder.

In embodiments, component A is a metal particle, while component B is a mechanically clad composite.

In embodiments, components A and B are each either mechanically clad composites or chemically clad composites.

In embodiments, component A is a composite with polymer that is mechanically clad while component B is a composite without polymer that is mechanically clad.

In embodiments, a first component is a composite that includes an organic binder, a metal phase, and a solid lubricant; and a second component is a composite having an organic binder, a metal phase and a polymer phase; wherein the apparent density difference between each component is less than the apparent density when compared to blending the individual components; wherein the first and second components are manufactured as either spray dried or mechanically clad material and the material are sprayed either with combustion or plasma spraying, preferably plasma spraying; and wherein the thermal spray powder has an overall particle size of about 10 to about 150 microns, preferably about 44 to about 150 microns. In embodiments, the metal phase is NiCr or 316 stainless steel and the solid lubricant is hexagonal boron nitride (HBN). In another embodiment the blend ratio for the second component into the first component is 0-40 wt %, preferably 5-30 wt %, more preferably about 7-15 wt %, more preferably about 8-12 wt %, and more preferably about 10 wt %. In another embodiment when one component is a metal, the blend ratio of the metal component to the solid lubricant and or polymer metal clad component is about 10-90 wt %, preferably 25-75 wt %, and more preferably 40-60 wt %.

The result is improved entrapments of solid lubricant and/or polymer phase through mechanical cladding and/or spray drying. This also results in more reproducible and consistent coating microstructures compared to co-spray or mechanical blends of various components with different densities. Higher temperature organic binders are used for improved mechanical integrity. The binders, in combination with the metal phase, help to minimize decomposition of the polymer phase.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted drawings by way of a non-limiting example embodiment of the present invention, and wherein:

FIG. 1 shows a first aspect of the invention.
FIG. 5 shows another aspect of the invention.
FIG. 6 shows another aspect of the invention.

DETAILED DESCRIPTION OF THE INVENTION

Figure 2:
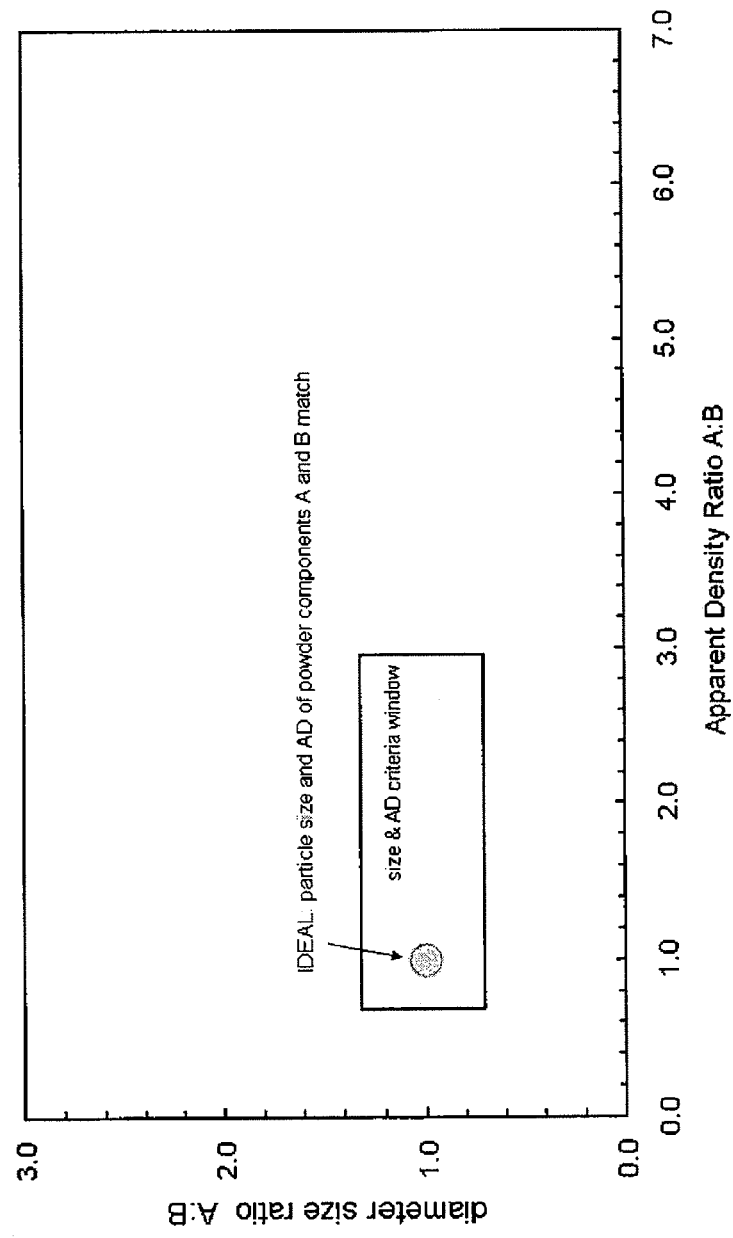
FIG. 2 shows another aspect of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In embodiments, component A is a metal particle, while component B is a mechanically clad composite.

In embodiments, components A and B are each either mechanically clad composites or chemically clad composites.

In embodiments, component A is a composite with polymer that is mechanically clad while component B is a composite without polymer that is mechanically clad.

In one embodiment of the invention, a first component is a composite that includes an organic binder, a metal phase, and a solid lubricant; and a second component is a composite that has an organic binder, a metal phase and a polymer phase; wherein the apparent density difference between each component is less than the apparent density when compared to blending the individual components; wherein the first and second components are manufactured as either spray dried or mechanically clad material and the material are sprayed either with combustion or plasma spraying, preferably plasma spraying; and wherein the thermal spray powder has an overall particle size of about 10 to about 150 microns, preferably about 44 to about 150 microns. In a preferred embodiment, the metal phase is NiCr or 316 stainless steel, or a metal powder, for example but not limited to iron, nickel or cobalt based or combinations of the three. Metal powders may also contain chromium between about 0-40 wt %, aluminum between about 0-15 wt %, and additional additives of key elements such as, but not limited to, yttrium, hafnium, silicon, rhenium, tantalum and tungsten. MCrAlY's and intermetallics, such as $Fe_3Al$, iron aluminide, nickel aluminide, may also be used. Similarly the solid lubricant is HBN. In another preferred embodiment the blend ratio for the second component into the first component is 0-40 wt %, preferably 5-30 wt %, more preferably about 7-15 wt %, more preferably about 8-12 wt %, and more preferably about 10 wt %. In another embodiment when one component is a metal, the blend ratio of the metal component to the solid lubricant and or polymer metal clad component is about 10-90 wt %, preferably 25-75 wt %, and more preferably 40-60 wt %.

This embodiment results in improved entrapments of solid lubricant and/or polymer phase through mechanical cladding and/or spray drying. This also results in more reproducible and consistent coating microstructures compared to co-spray or mechanical blends of various components with different densities. Higher temperature organic binders are added for improved mechanical integrity. The binder in combination with metal phase also helps to minimize decomposition of the polymer phase.

In embodiments of the invention, the thermal spray powder has an overall particle size of about 10 to about 150 microns, preferably about 44 to about 150 microns.

In embodiments of the invention, the overall powder is a composite of one or two constituents.

In embodiments, a first component has an organic binder, a metal phase, and a solid lubricant. The metal phase may be, for example, NiCr or 316 stainless steel, or a metal powder, for example but not limited to iron, nickel or cobalt based or combinations of the three. Metal powders may also contain chromium between about 0-40 wt %, aluminum between about 0-15 wt %, and additional additives of key elements such as, but not limited to, yttrium, hafnium, silicon, rhenium, tantalum and tungsten. MCrAlY's and intermetallics, such as $Fe_3Al$, iron aluminide, nickel aluminide, may also be used. The solid lubricant may be, for example, agglomerated hexagonal boron nitride (ABN), HBN.

In embodiments, a second component has an organic binder, a metal phase and a polymer phase.

In embodiments, the blend ratio for the second component constituent 2 into constituent 1 is 0-40 wt %, preferably 5-30 wt %, more preferably about 7-15 wt %, more preferably 8-12 wt %, and more preferably about 10 wt %.

In another embodiment, a first component is a metal as defined above and the second component is a mechanically clad solid lubricant with an organic binder. The cladding may be the same as the metal used in the first component. The solid lubricant and the binder may be as listed above. In another embodiment, a polymer can be substituted for the solid lubricant. The blend ratio of the metal component to the solid lubricant clad component is about 10-90 wt %, preferably 25-75 wt %, and more preferably 40-60 wt %. When the polymer is substituted for the solid lubricant, the preferred blend ratio is about 10-20 wt. %.

In embodiments, the first and second components can be manufactured as either spray dried or mechanically clad material. In embodiments, the first and second components are sprayed either with combustion or plasma spraying, preferably plasma spraying, forming a coating, preferably an abradable coating.

In embodiments, when a coating is made, a polymer is used to control porosity, and solid lubricant reduces frictional heating by a blade tip when the blade tip cuts the coating at different incursions and speeds. Together or separately, polymer and/or lubricant reduces inter-particle cohesive strength of the thermal spray coating. In some cases polymers are composited with solid lubricant to achieve many of the advantages.

Two approaches of manufacturing these abradable coatings are: Blending or Co-spraying. The benefit of co-spraying is more control of process since density differences in blends may lead to separation in a feeder device or in handling; this does not occur in co-spray processes. The disadvantage of co-spraying is that polymers and/or solid lubricants have low density, they are hard to feed and tend to melt or decompose in plasma flame. This results in manufacturing down time and material loss. In some cases nozzle build-up and/or nozzle loading may also occur resulting in excessive production down time. The benefit of a blend is a simpler overall process for manufacturing abradable coatings and abradable seals.

In contrast, agglomeration by mechanical cladding of the solid lubricant increases density so that it approaches density of metal or ceramic matrix phase; allowing for more 1) blend uniformity; 2) higher entrapment of the solid lubricant phase when applied by via thermal spray process and 3) better flowability when co-sprayed due to increase particle weight.

For example, mechanical agglomeration using a cladding process uses solid lubricant, such as HBN, and cladding with a fine metal powder, for example nickel alloy and organic binder. The metal powder is generally less than 44 microns in size, and is typically less than 20 microns, and the solid lubricant is generally greater than 54 microns, and is typically 120 microns on average.

The metal powder can be iron, nickel or cobalt based or combinations of the three. Metal powders may also contain chromium between about 0-40 wt %, aluminum between about 0-15 wt %, and additional additives of key elements such as, but not limited to, yttrium, hafnium, silicon, rhenium, tungsten, tantalum and tungsten. MCrAlY's and intermetallics, such as $Fe_3Al$, iron aluminide, nickel aluminide, may also be used.

Final agglomeration can then be screened to less than about 60 mesh, which is about 250 microns. In a preferred embodiment the final agglomeration can then be screened between less than about 60 mesh, which is about 250 microns and at greater than about 230 mesh, which is about 63 microns.

The 63-250 micron size powder is clad with fine particles of metal attached to the wall of the solid lubricant with an organic binder. Solid lubricants can be, for example, HBN, agglomerated boron nitride (ABN), graphites, fluorides, talc. Generally the solid lubricant will be greater than about 45 microns, and preferably greater than about 53 microns.

The solid lubricant can be substituted with a polymer, whereby the polymer can be polyesters, polyamides, polyimides and/or acrylic based polymers. Generally the polymer powder will be greater than about 45 microns, and preferably greater than about 53 microns.

Cladding increases the density of the powder and protects solid lubricant/polymer from the high temperature plasma or combustion flame thereby reducing decomposition during the coating process. Additionally, the increased density results in greater chemical uniformity of the resultant blends. The increased density will also improve flowability if the powder is co-sprayed with metal or ceramic.

In a typical blend ratio, the polymer or solid lubricant clad material is about 10-20 wt % when with metal or ceramic powder.

The metal/ceramic powder can be the same or different chemistry and/or manufacturing process as metal/ceramic used in cladding process. Generally the size of metal/ceramic powder is between about 120 microns and about 45 microns. However, powder range could be −250 microns+10 microns. When co-sprayed, typical deposition rate of metal to clad composite is about 1:1 to 3:1 with and entrapment of clad particle in the coating of 20-50 vol %.

It should be understood that HBN can be replaced by ABN, which can be, e.g., bentonite binder with HBN composite, graphite or a polymer. The polymer is, for example, but not limited to, polyester, polyamides, polyimides, and/or acrylic based polymers.

It should be understood that the metal alloy can be replaced by metal oxide ceramics such as, for example, yttria stabilized zirconia.

It should be understood that the binder can be organic or inorganic.

FIG. 1 shows the component A 10 NiCrAl clad agglomerated hexagonal boron nitride (ABN) and the component B 12 Ni clad Polyester forming the mechanical blend of A+B 14. Shown in FIG. 2, when components A and B have almost equal powder apparent densities (AD) and size ratios, handling, blending and spray parameter issues are significantly reduced compared to current and past products. In one example of this embodiment, component A 10 has, for example d50 particle size: 68 μm and component B 12 has, for example d50: 72 μm. In a preferred embodiment, component A 10 is an agglomeration by spray drying of NiCrAl clad ABN with NiCrAl. In another embodiment, component A 10 is atomised and has a d50 of approximately 20 um.

In another example, the use of even finer HBN is a substitute for ABN, together with NiCrAl cladding. When the d50 is below approximately 50 microns on a clad BN, then the powder should be agglomerated. Cladding fine, for example 10 micron HBN is also feasible. However, it should be noted that agglomeration introduces binders which introduce another variant to coating properties. Another example is to agglomerate NiCrAl clad HBN with d50 about 10 microns, and then blend this agglomerated material with Ni clad polyethylene.

While this is centered around the autoclaving approach, this can be expanded by using composite powders in general, with continuous or autoclave cladding being only one method of providing the composite. The approach of having a blend of two composites 14, as shown in FIG. 1, whether chemically clad or autoclave clad or otherwise, is a composite powder for thermal spray applications where the final composition consists of a blend of two different constituents A and B, where constituent A is a composite of a solid lubricant and a metal/alloy and/or ceramic and where constituent B is a composite of a plastic/polymer and a metal or alloy.

When ABN is part of constituent A, in one example the thermal spray powder is such that Constituent A is composite of: Metal/alloy+solid lubricant (HBN)+ceramic composite and Constituent B is composite of: Metal/alloy+plastic resulting in four distinctly different phases making this a four-phase blend.

It should be understood that the ceramic composite in constituent A is what is added to the HBN to make it ABN.

Figure 3:
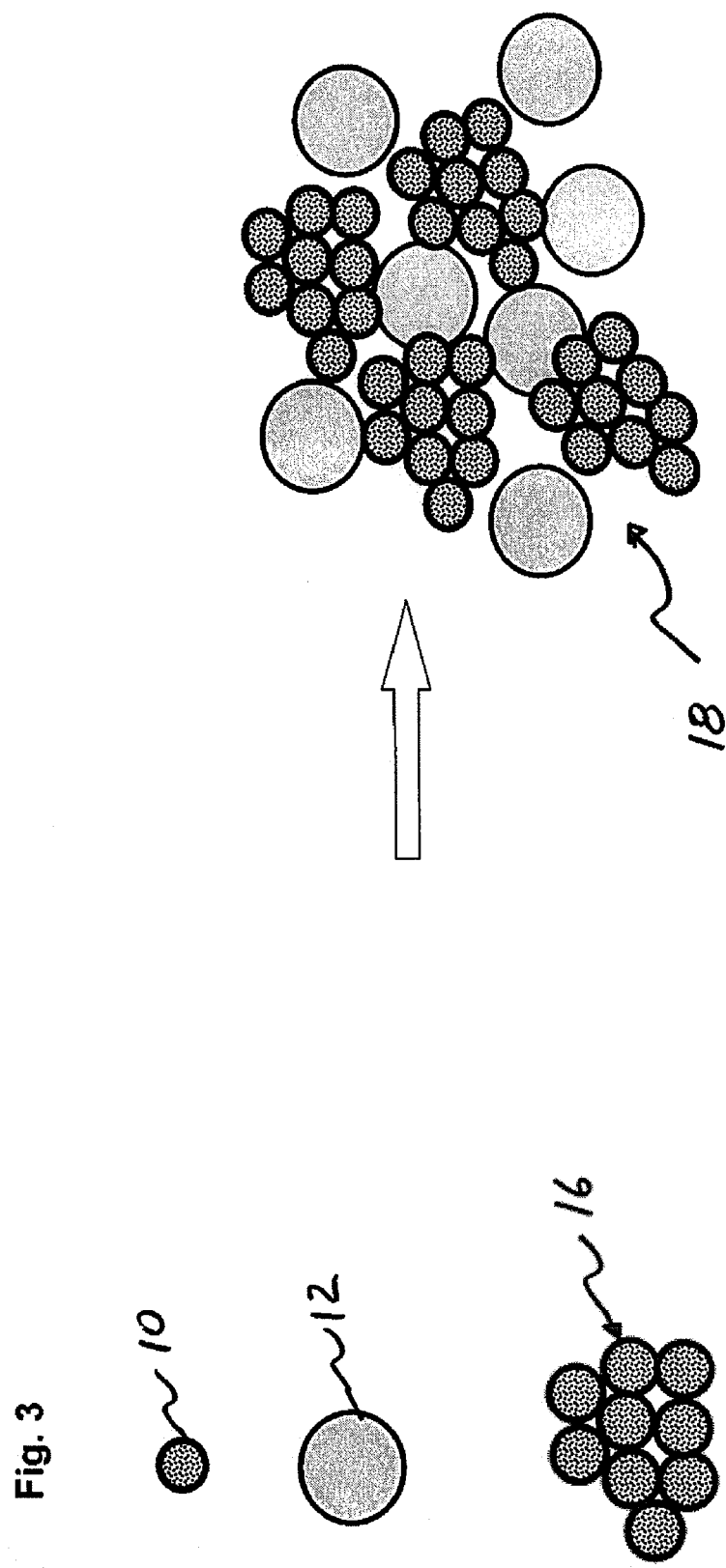
FIG. 3 shows another aspect of the invention.
Figure 4:
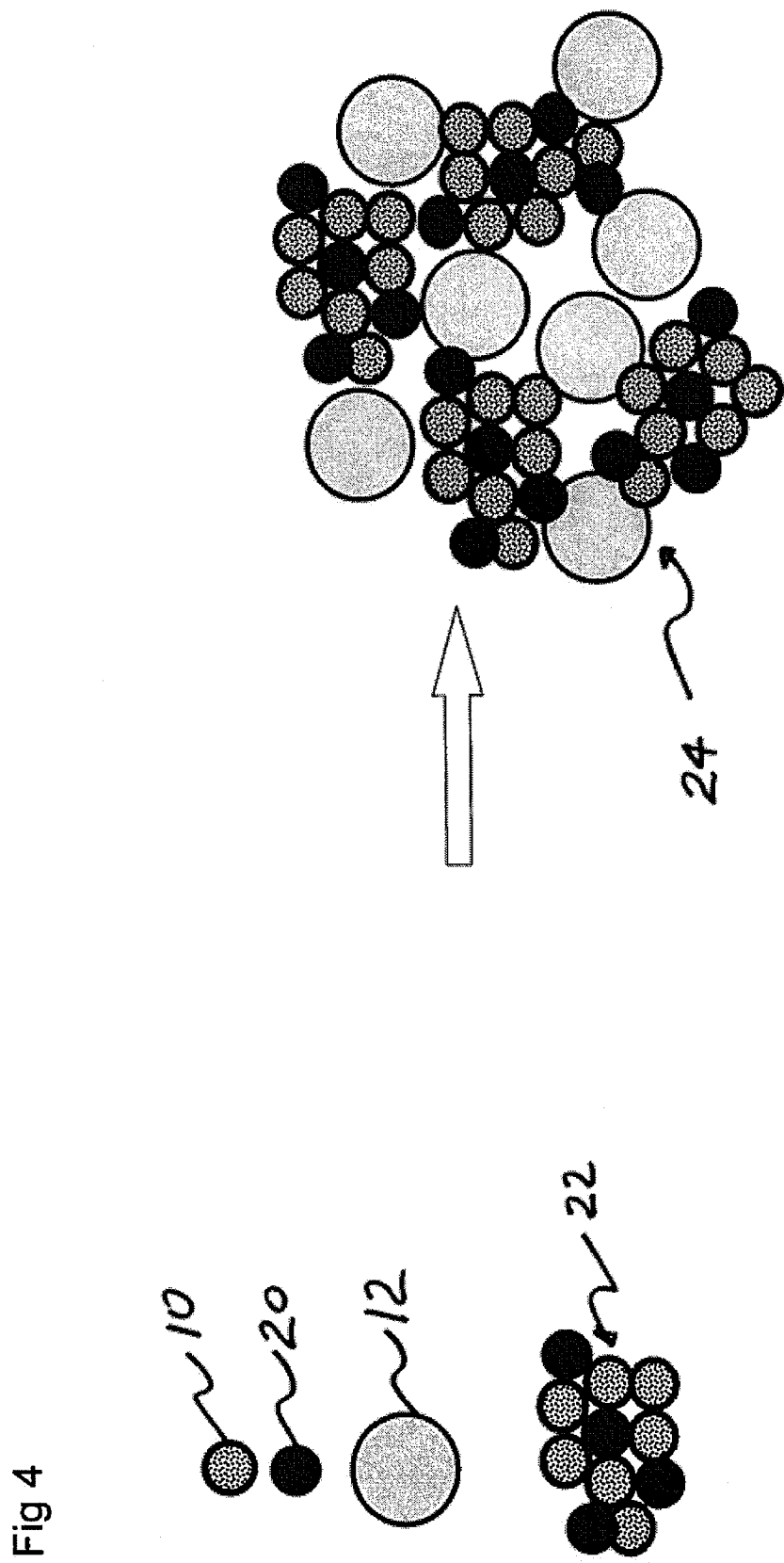
FIG. 4 shows another aspect of the invention.

Another example is cladding, using a binder, of a metal alloy onto ABN and polymer. For example, Ni5Cr5Al can be used as a cladding alloy for polymer with a fine enough grade. In this manner there is less residual nickel after spraying and the result is better oxidation resistance. Shown in FIG. 3, component A 10 is agglomerated with a binder to form component A agglomerated 16. A blend of component A agglomerated 16 with component B 12 results in the blend 18.

For light and/or friable powder materials, cladding with a protective (metal) coating is needed for product spray and manufacture robustness. Minimum and maximum particle size ranges for components A and B are predefined. A "mismatch" in particle size and apparent density (AD) between components A and B should not fall outside a predetermined window. One preferred embodiment is when AD and particle size of component A is approximately or equal to component B, or when the apparent density and particle size of component A approaches the apparent density and particle size of component B.

Generally, higher AD's for components A and B are beneficial in terms of spraying because they are less affected by thermal spray process induced gas turbulence and air currents.

In another embodiment, the AD for component A, the metal clad polymer, is 2.2 or greater. The increase of the AD of the clad ABN from about 1.7 to 2.2 or higher may be accomplished by introducing some very fine, but high density material in the boron nitride (ABN) agglomerate, for example zirconia, ytterbia, dysprosia, or metal. This will result in a more robust product for spraying. In another embodiment, the AD can also be similarly increased by increasing thickness of the clad. Caution must be used not to add too much metal matrix as this could overprotect the boron nitride.

Binders are often referred to as 'temporary binding agents' when talking about making granulates. Known organic binder materials include poly vinyl alcohols which include polyvinyl acetate (PVA), polyvinyl pyrrolidinone (PVP) and any others similar binders. Binders also include various synthetic and natural polymers, for example, acrylic latex compositions and carboxymethylcellulose (CMC), and other similar compounds.

As described above, the thermal spray powder has a first component A mechanically blended with a second component B, wherein the first component A is at least one of Ni—Cr—Al clad ABN, Ni—Cr—Al clad HBN, Ni—Cr—Al clad agglomerated boron nitride powder, Ni—Cr—Al clad agglomerated hexagonal boron nitride powder with organic binder, and Ni—Cr—Al agglomerated hexagonal boron nitride powder with inorganic binder, and wherein component B is a polymer clad with at least one of nickel, nickel alloys, nickel chrome alloys, nickel chrome aluminum alloys, nickel aluminum alloys, cobalt and cobalt alloys.

In another embodiment, the clad polymer is a fugitive phase. In another embodiment, the clad polymer is a porosity former. In another embodiment, the particle size is about 40 to about 120 microns. In another embodiment, the average particle size ratio of component A to component B is approximately 0.5 to approximately 1.5, preferably approximately 0.7 to approximately 1.3 for d50 size fraction. In another embodiment, the apparent density for component A is a minimum of 1.5. In another embodiment, the apparent density of component B is a minimum of 2.5.

In another embodiment, the Ni—Cr—Al clad ABN is approximately 5 wt. % to approximately 15 wt. % Cr and approximately 5 wt. % to approximately 15 wt. % Al.

In another embodiment, the thermal spray powder further comprises component A', wherein A' is Ni 5+x wt. %-Cr 5+y wt. %-Al clad ABN, and wherein x is greater than 5 wt. % and y is 0-10 wt. %.

FIG. 4 shows another example of a blend of the invention. Component A 10 is agglomerated with component C 20 with either an organic or inorganic binder (not shown), to form component A+C agglomerate 22. Component C 20 is nickel or cobalt alloy. When Component B 12 is blended with Component A+C 22, the result is blend 24. Blend 24 is an example of five distinctly different phases making this a five phase blend.

FIG. 5 shows another example of a blend of the invention. Component B 12 continues to be nickel clad polyester, and component C 20 continues to be nickel or cobalt alloy. Component D 26 is ABN or HBN. First, Component C 20 and Component D 26 are agglomerated with an organic or inorganic binder (not shown) to form component C+D agglomerate 28. When component B 12 is blended with component C+D 28, the result is new blend 30.

FIG. 6 is an example of a variation of component B 12 that can be used in any of the inventive blends. The clad polyester core 40 for component B 12 is replaced by an agglomerate of polyester/polymer 34 plus metal alloy 32 and/or HBN or very fine high density ceramic phase. This increases the density of the polyester phase even more. Nickel alloy or cobalt alloy and/or fine hexagonal boron nitride and/or very fine high density ceramic, collectively 32, is agglomerated with a polymer 34 with a binder (not shown), and this agglomerate is then clad with nickel or cobalt alloy cladding 36.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and sprit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed as new and desired to be protected by Letters Patent of the United States is:

1. A thermal spray powder comprising:

a first component A mechanically blended with a second component B, wherein the first component A is a solid lubricant clad with at least one of a metal and/or metal alloy, and wherein the second component B is one of:

a metal or a polymer clad with at least one of nickel, nickel alloys, nickel chrome alloys, nickel chrome aluminum alloys, nickel aluminum alloys, cobalt and cobalt alloys.

2. There thermal spray powder of claim 1, wherein the first component A is at least one of Ni—Cr—Al clad ABN, Ni—Cr—Al clad HBN, Ni—Cr—Al clad agglomerated hexagonal boron nitride powder with organic binder, Ni—Cr—Al agglomerated hexagonal boron nitride powder with inorganic binder, an MCrAlY type powder where M is at least one of Ni, Co and Fe and agglomerated hexagonal boron nitride powder with inorganic or organic binder, and an intermetallic alloy and agglomerated hexagonal boron nitride powder with inorganic or organic binder.

3. There thermal spray powder of claim 1, wherein the lubricant in the first component A is at least one of hexagonal boron nitride, hexagonal boron nitride agglomerated with a bentonite binder (ABN), graphites, fluorides, and talc.

4. The thermal spray powder of claim 1, wherein component A is Ni 5%-Cr 5%-Al clad ABN.

5. The thermal spray powder of claim 1, wherein the clad of component A comprises clad layers that alloy together.

6. The thermal spray powder of claim 2, wherein the organic binder is at least one of a polyvinyl alcohol, polyvinyl acetate, polyvinyl pyrrolidinone, carboxymethylcellulose and an acrylic latex composition.

7. The thermal spray powder of claim 1, wherein the polymer is at least one of a polyester, polyamides, polyimides and acrylic based polymers.

8. The thermal spray powder of claim 1, wherein the clad polymer is one of a fugitive phase and a porosity former.

9. The thermal spray powder of claim 5, wherein the particle size is 40 to 120 microns.

10. The thermal spray powder of claim 1, wherein the average particle size ratio of component A to component B is approximately 0.5 to approximately 1.5 for d50 size fraction.

11. The thermal spray powder of claim 1, wherein an apparent density for component A is a minimum of 1.5.

12. The thermal spray powder of claim 1, wherein an apparent density of component B is a minimum of 2.5.

13. The thermal spray powder of claim 1, wherein the component A is Ni—Cr—Al clad ABN that has approximately 5% to approximately 15% Cr and approximately 5% to approximately 15% Al.

14. The thermal spray powder of claim 1, further comprising component A', wherein A' is Ni 5+x %-Cr 5+y %-Al clad ABN, and wherein x is greater than 5% and y is 0-10%.

15. The thermal spray powder of claim 1, wherein component B is a nickel clad agglomerate of fine polyester and alloy particles.

16. The thermal spray powder of claim 1, wherein the thermal spray powder is four distinctly different phases making the powder a four-phase blend.

17. A method of making the thermal spray powder of claim 1, the method comprising:
mechanically blending powder particles of component A with powder particles of component B in order to form a thermal spray powder.

18. The thermal spray powder of claim 1, wherein when component B is a metal, the blend ratio of the metal component B to the solid lubricant clad component A is between about 10-90 wt %.

19. The thermal spray powder of claim 3, wherein the ABN comprises at least one of zirconia, ytterbia, dysprosia, and metal.

20. The thermal spray powder of claim 18, wherein the blend ratio of the metal component B to the solid lubricant clad component A is between 25-75 wt %.

21. The thermal spray powder of claim 20, wherein the blend ratio of the metal component B to the solid lubricant clad component A is between 40-60 wt %.

22. A thermal spray powder comprising:
a first component A mechanically blended with a second component B;
the first component A being a solid lubricant clad with at least one of a metal and/or metal alloy, and
the second component B being one of:
a metal comprising iron, nickel, cobalt, chromium, or aluminum, or
a polymer clad with at least one of nickel, nickel alloys, nickel chrome alloys, nickel chrome aluminum alloys, nickel aluminum alloys, cobalt and cobalt alloys.

23. A thermal spray powder comprising:
particles of component A mechanically blended with particles of component B;
the component A being one of:
a solid lubricant clad with at least one of a metal and/or metal alloy, and
a polymer clad with at least one of a metal and/or metal alloy, and
the component B comprising a non-solid lubricant metal.

24. A thermal spray powder comprising:
particles of component A mechanically blended with particles of component B;
the component A being a solid lubricant clad with at least one of a metal and/or metal alloy, and
the component B comprising a same metal or metal alloy as that of the clad of component A.

25. A thermal spray powder comprising:
powder particles of component A mechanically blended with powder particles of component B;
the component A being a solid lubricant clad with at least one of a metal and/or metal alloy, and
the component B comprising a polymer clad with at least one of nickel, nickel alloys, nickel chrome alloys, nickel chrome aluminum alloys, nickel aluminum alloys, cobalt and cobalt alloys.

* * * * *